United States Patent [19]

Sha et al.

[11] 3,708,766

[45] Jan. 2, 1973

[54] AUTOMATIC EQUALIZER AND METHOD OF OPERATION THEREFOR

[75] Inventors: Richard T. Sha, Mohegan Lake; Donald T. Tang, Yorktown Heights, both of N.Y.

[73] Assignee: International Business Machines Corporation, Armonk, N.Y.

[22] Filed: Dec. 31, 1970

[21] Appl. No.: 103,235

[52] U.S. Cl. .......................................333/18, 325/42

[51] Int. Cl. ..............................................H04b 3/04

[58] Field of Search ............325/42; 333/18, 70 T, 28

[56] References Cited

UNITED STATES PATENTS

| | | | |
|---|---|---|---|
| 3,400,332 | 9/1968 | O'Neill, Jr. et al. | 333/18 X |
| 3,414,819 | 12/1968 | Lucky | 333/18 X |
| 3,445,771 | 5/1969 | Clapham et al | 333/18 X |

*Primary Examiner*—Paul L. Gensler

*Attorney*—Hanifin & Jancin and Thomas J. Kilgannon, Jr.

[57] ABSTRACT

An automatic equalizer with extremely fast convergence is disclosed. The weight setting procedure or algorithm is basically an iterative operation which can be conveniently expressed by cascaded equalizers. One form of the apparatus utilized consists of a plurality of equalizer stages which have their tap settings changed after successive iterations (the first iteration adjusts the first equalizer stage, the second iteration adjusts the second equalizer stage and so on) such that after n iterations a given initial distortion D is reduced to at most D² . The algorithm involved and the method of operating the equalizer is also disclosed.

26 Claims, 4 Drawing Figures

INVENTORS
RICHARD T. SHA
DONALD T. TANG

BY Thomas J. Kilgannon Jr.
ATTORNEY

AUTOMATIC EQUALIZER AND METHOD OF OPERATION THEREFOR

BACKGROUND OF THE INVENTION

1. Field of the Invention

This invention generally relates to systems and their method of operation which eliminate or reduce distortion which appear on electrical signals used for digital data transmission. More specifically it relates to automatic equalization systems and their method of operation which have extremely fast convergence, that is, a given amount of distortion can be essentially eliminated in a minimal time. One implementation consists of a plurality of equalizer stages arranged in cascade, the taps of which are adjusted one per iteration and in succession in accordance with the same given algorithms. In this arrangement, the number of equalizer stages determines the number of iterations required.

2. Description of the Prior Art

When signals are transmitted through a transmission medium, a certain amount of distortion usually results even under noiseless conditions. The distortion encountered may be attributed to the undesirable characteristics of the transmission medium. In the basic form of digital data transmission, symbols from a finite alphabet are transmitted at a fixed rate as pulses of various magnitudes or some other modulated signal wave form. At the receiving end, the received signal is periodically sampled at the same rate to determine what the input signals were. Distortion of the received wave forms results in inter symbol interference between adjacent samples. Typically, a pulse at the transmitter will appear at the receiver to contain a main pulse and a number of "side lobes" on both sides of the main pulse. In binary data transmission, the sum of the magnitudes of the side lobes is defined as the total distortion when the main pulse is scaled or normalized to unity.

To minimize undesired intersymbol interference due to linear distortion, filters having compensating characteristics called "equalizers" are used. A special class of time-domain filters is particularly suitable in digital transmissions. Basically, a time-domain filter consists of a number of delay sections in series each section having the same delay, a number of taps between the delay sections with adjustable tap gains, and a summing circuit or element. Two types of time domain filters are: the non-recursive or transversal type and, the recursive type. Since the usual channel characteristics are not known beforehand and may be subject to time variations, it is necessary to be able to automatically tune the equalizer to any desired channel. This means that a system must be devised to obtain weights for the tap gains such that the total distortion is reduced to a minimum.

A general procedure for the automatic adjustment of an equalizer during a training period is to send a train of isolated pulses through a channel prior to actual data transmission. A weight adjustment of the tap gains takes place immediately after each training pulse.

Using the above-mentioned principle, a fixed increment weight-correction procedure has been implemented as an automatic equalizer by the prior art. Using this technique, the channel response can be greatly improved. As a result, multilevel transmissions up to 16 levels over some voice grade channels now seems feasible. In the prior art iterative weight-correction scheme, only a fixed increment is used at a time. A smaller correction increment would result in better equalization, but it would also require a greater convergence time. At present, there are a number of modifications of the iterative weight-correction scheme which permit improved convergence.

Recent trends in data communications demand faster convergence in automatic equalizer because it is important to improve the system's efficiency by minimizing the turnaround time in high speed data transmission systems. For this reason, fast convergence in weight adjustment is extremely desirable in any sort of computer-communication systems. Such systems are ones with multi-drop remote terminals, time sharing or multiplexing systems and the like. In view of this, automatic equalizers with performance capabilities beyond existing systems are required which specifically take into consideration the minimizing of convergence time. The main distinction between the prior art equalizers and the equalizers of the present invention is that the distortion corrections of the equalizers in the known structures are additive from one iteration to the other but are multiplicative in the equalizers of the present application.

SUMMARY OF THE INVENTION

The present invention relates generally to methods and apparatuses for equalizing electrical signals which have been subjected to distortion by a transmission medium. The method of the present invention, in its broadest aspect, comprises the steps of applying an electrical signal sequence represented by the function 1−A to an equalizer arrangement having a plurality of adjustable tap settings and equalizing the signal to provide, after $n$ iterations, an output signal represented by the function $1-A^{2^n}$ where $n = 1, 2, 3, \ldots$ More specifically, the invention includes a method for equalizing an electrical signal represented by the function 1−A which comprises the steps of applying the electrical signal for $n$ iterations to a plurality of equalizer stages each of which has adjustable tap settings. The method then calls for modifying the electrical signal in each of the equalizer stages to produce successive outputs at the $n^{th}$ of said equalizer stages for successive iterations as represented by the function $1-A^{2^n}$ where $n = 1, 2, 3, \ldots$ In accordance with still more specific aspects, the method of the present invention which calls for the step of equalizing an electrical signal represented by the function 1−A, includes the steps of passing the electrical signal through n equalizer stages and modifying the signal in a summing circuit to provide the function $1+A^{2^n}$ The equalization step also includes the step of feeding the modifying function $1+A^{2^n}$ to a tap adjusting means and modifying the tap settings of the $n+1^{th}$ equalizer stage in accordance with the function $1+A^{2^n}$ where $n = 0, 1, 2, 3, \ldots$ In accordance with still more specific steps, the method of the present invention includes the step of applying the distorted electrical signals to a signal averaging circuit to generate an output signal which is the average of a number of input signals. Other more specific steps include the steps of normalizing the input function at the beginning of each iteration to normalize the main pulse of the electrical signal sequence to unity and initially adjusting the tap settings of the plurality of equalizers to zero with the exception of tap settings which correspond to the main pulse of the sequence, the latter being adjusted to unity.

In its broadest aspect, apparatus for equalizing an electrical signal in accordance with the teaching of the present invention comprises a signal source for producing an electrical signal; a communications medium connected to the signal source which introduces distortion on the electrical signal to provide a distorted electrical signal represented by the function $1-A$. Also included is means connected to the communications medium for equalizing the distorted electrical signal to provide at the output thereof an output signal represented by the function $1-A^{2^n}$ after $n$ iterations where $n = 1, 2, 3, \ldots$ In accordance with a more specific aspect of the present invention, the equalization means includes a plurality of equalizer stages each having a plurality of adjustable tap settings, the output of one stage being connected to the input of a succeeding equalizer stage. Means are connected to the last of the equalizer stages for modifying the output signals to provide the function $1+A^{2^{n-1}}$ and means for adjusting the tap settings associated with the $n^{th}$ equalizer stage are connected to the modifying means and the adjustable tap settings.

In accordance with a more specific aspect of the present invention, apparatus for equalizing an electrical signal represented by the function $1-A$ includes means for applying the electrical signal for n iterations to a plurality of cascaded equalizer stages each of which have a plurality of adjustable tap settings. Means connected to the last of the plurality of equalizer stages and the plurality of adjustable tap settings are called for for modifying the tap settings to produce successive outputs at the $n^{th}$ of the equalizer stages for successive iterations as represented by the function $1-A^{2^n}$ where $n = 1, 2, 3, \ldots$ In accordance with still more specific aspects of the present invention, summer circuits which convert the function $1-A^{2^n}$ through $1+A^{2^n}$ are called for. In addition, averaging circuits for generating an output signal which is the average of a plurality of input signals are called for and the equalizer stages are characterized as either being of the tapped delay line or shift register types.

The above-mentioned method and apparatus permits equalization of both distorted digital and analog signals at extremely high convergence rates. This is very significant at a time when central processing units are being asked to service a large number of remote terminals using commercially available communications, i.e., telephone lines. Under such circumstances maximum equalization of a distorted signal should be achieved in a minimum of time to render the transmission of data less costly for the user and more highly efficient for the data processor. The apparatus and method of the present invention is believed to satisfy both of the aforementioned requirements.

It is, therefore, an object of the present invention to provide method and apparatus for equalizing an electrical signal which has extremely fast convergence.

Another object is to provide an automatic equalizer and method of operation therefor which is suitable for use with both digital and analog signals.

Still another object is to provide an iteration equalization operation in a cascaded equalizer stage arrangement which can be economically implemented.

The foregoing and other objects, features and advantages of the present invention will be apparent from the following more particular description of preferred embodiments as illustrated in the accompanying drawings:

DESCRIPTION OF PREFERRED EMBODIMENTS

Figures 1A, 1B:
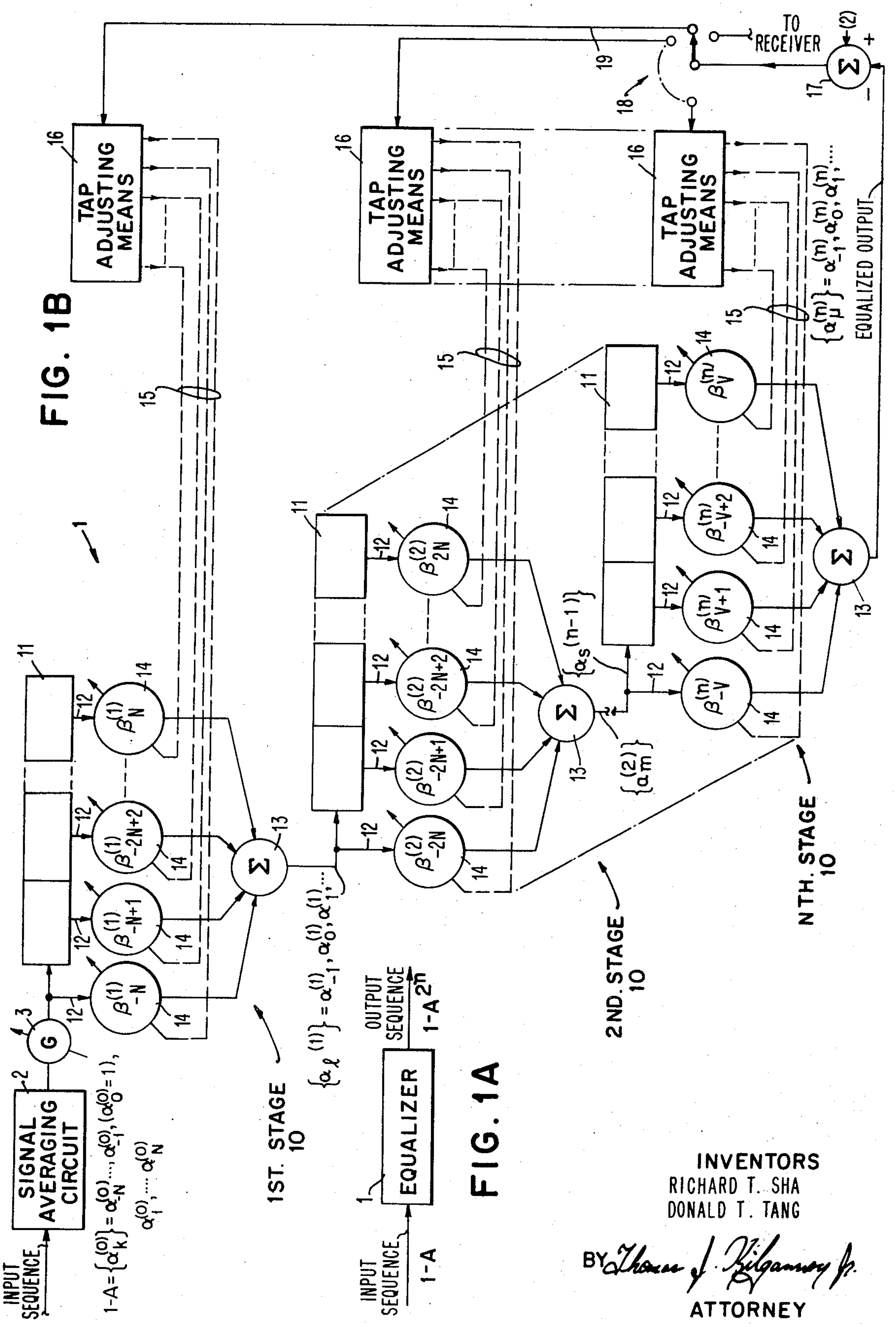
FIG. 1A is a block diagram of a generalized equalizer in accordance with the present invention which modifies an input sequence represented by the function $1-A$ to provide, after $n$ iterations, an equalized output sequence represented by the function $1-A^{2^n}$.
FIG. 1B is a cascaded equalizer in accordance with the present invention showing a plurality of equalizer stages, their associated adjustable tap settings, a summing circuit which converts the output of the $n^{th}$ equalizer and tap adjusting means associated with each equalizer which adjust the tap settings in accordance with the modified output of the $n^{th}$ equalizer.

Referring now to FIG. 1A, there is shown therein a block diagram of a non-recursive equalizer which is a generalized version of a particular embodiment of the present application to be discussed in detail hereinbelow.

Let $\{\alpha_k^{(0)}\} = \alpha_{-N}^{(0)}, \ldots, \alpha_{-1}^{(0)}, \alpha_0^{(0)}, \alpha_1^{(0)}, \ldots, \alpha_N^{(0)}$ be sampled values of the output of the transmission medium in response to a unit pulse input. Then, $\{\alpha_k^{(0)}\}$ is also the input sequence to the equalizer and can be decomposed as the main pulse (normalized as unity) and the sidelobes, $A^{(0)}$. In terms of $z$-transform expansion, the original channel response is $$A^{(0)} = \sum_{k=-N}^{N} \alpha_k^{(0)} z^{-k} \tag{1}$$

The initial distortion sequence can be defined as $$A^{(0)} = 1 - A^{(0)} = 1 - \sum_{k=-N}^{N} \alpha_k^{(0)} z^{-k} \tag{2}$$

The "magnitude" of a distortion sequence $A^{(i)}$ is defined as the sum of the magnitudes of elements in the sequence.

$$|A^{(i)}| = \sum_{k=-N}^{-1} |\alpha_k^{(i)}| + |1-\alpha_0^{(i)}| + \sum_{k=1}^{N} |\alpha_k^{(i)}| \tag{3}$$

The normalized distortion can be expressed as $$D^{(i)} = \frac{|A^{(i)}| - |1-\alpha_0^{(i)}|}{|\alpha_0^{(i)}|} \tag{4}$$

It is well known (p. 134 of Lucky et al., "Principle of Data Communication," McGraw Hill, 1968) that a linear digital filter (or equalizer) is characterized by its "transfer function" defined as the ratio of $z$-transforms of the output and input sequences. It is also well known that the tap settings in a non-recursive transversal filter corresponds directly to the coefficients in its transfer function. More specifically, the transfer function of the first stage equalizer in FIG. 1B is simply $$\beta_{-N}{}^{(1)} + \beta_{-N+1}{}^{(1)} Z^{-1} + \beta_{118\,N+2}{}^{(1)} Z^{-2} + \ldots + \beta_N{}^{(1)} Z^{-2N} = Z^{-N}\left[\beta_{118\,N}{}^{(1)} Z^{N} + \beta_{-N+1}{}^{(1)} Z^{N-1} + \ldots + \beta_N{}^{(1)} Z^{-N}\right] \quad (5)$$

In the analysis that follows, only the expression in the brackets is used for the transfer functions. The inherent delay of $N$ sampling periods represented by $Z^{-N}$ is automatically compensated by reading the output sequence with the same amount of delay. For a given input sequence to an equalizer the $z$-transform expression of the output sequence is simply the product of the $z$-transform of the input sequence and the transfer function of the equalizer. The multiplication of polynomials follows the ordinary rules for polynomials multiplication.

It has been recognized that an input sequence shown in equation (1) may be represented by the function $1-A$ and can be modified in such a way that an output is produced which is represented by the function $1-A^{2^n}$. This latter function can be accomplished by modifying the input $1-A$ by the transfer function $1+A$ to produce after one iteration, the output $1-A^2$. If $n$ equals one, (the number of the iteration), then it is seen that this output conforms to the desired function $1-A^2 = 1-A^{2^n}$ Characterizing the modifying function in the same manner, the general modifying function $1+A$ becomes $1-A^{2^n}$. Also, characterizing the input function in the same manner, the generalized input function becomes $1-A^{2^n}$.

From the foregoing, the input function, the modifying function and the output function may be determined for any desired iteration. Table I below shows the value of each function after each iteration.

TABLE I

| Iteration | Input Function $1-A^{2^{n-1}}$ | Modifying Function $1+A^{2^{n-1}}$ | Output Function $1-A^{2^n}$ |
|---|---|---|---|
| 0 | $1-A$ | 1 | $1-A$ |
| 1 | $1-A$ | $1+A$ | $1-A^2$ |
| 2 | $1-A^2$ | $1+A^2$ | $1-A^4$ |
| 3 | $1-A^4$ | $1+A^4$ | $1-A^8$ |
| 4 | $1-A^8$ | $1+A^8$ | $1-A^{16}$ |
| $n$ | $1-A^{2^n-1}$ | $1+A^2$ | $1-A^{2^n}$ |

Thus, after the $0^{th}$ iteration, the output function as shown in Table I is the same as the input because all of the tap settings on equalizer 1 have been set to 0 except the center tap which is set to unity. For each succeeding iteration, Table I gives the value of the input required, the modifying function and the output obtained from equalizer 1 of FIG. 1A. Having recognized the relationship between the input function, the output function and the modifying function, the values in Table I are obtained by simply substituting the iteration number for $n$ in each of the generalized functions.

Based on the foregoing, a generalized method of operation of a non-recursive equalizer may be characterized by the steps of applying to an equalizer an electrical signal represented by the function $1-A$ and equalizing the input signal to provide after $n$ iterations an output signal represented by the function $1-A^{2^n}$ where $n = 1, 2, 3 \ldots$. While this treatment does not characterize the modifying function, it should be clear that the input function $1-A$ may be modified in a number of ways to produce the desired output function $1+A^{2^n}$. One arrangement for producing the desired output in accordance with the input function and the modifying function referred to in Table I above is shown in FIG. 1B.

Referring now to FIG. 1B, there is shown therein an embodiment of an equalizer structure 1 consisting of cascaded stages of transversal filters which may be utilized in implementing the generalized arrangement of FIG. 1A. In this arrangement, the sampled output of a transmission line or other channel is the input sequence which may be represented by the function $1-A$ to the first of the cascaded stages of the equalizer. The improved signal at the output of one stage feeds a succeeding stage and so on. A simple systematic procedure for setting the tap gain successively in the stages will be shown hereinbelow to guarantee the convergence of total distortion if the initial distortion is less than unity.

Since a given input sequence ($\alpha_{-N}{}^{(0)}, \alpha_{-N+1}{}^{(0)}, \ldots \alpha_0{}^{(0)}, \ldots \alpha_n{}^{(0)}$) can always be scaled (by proper gain adjustment) so that the main pulse $\alpha_0{}^{(0)}=1$, we have initially, in accordance with equation (4), $$D^{(0)} = |A^{(0)}| \quad (6)$$

When $D^{(0)}<1$, the equalizer output after $i$ iteration yields a magnitude of its corresponding distortion sequence $$|A^{(i)}| = |[A^{(0)}]^{2^i}| \quad (7)$$

which can be easily shown to satisfy the following inequality $$|A^{(i)}| = |[A^{(0)}]^{2^i}| \leqq |A^{(0)}|^{2^i} \quad (8)$$

This quantity converges to zero as $i$ increases. The normalized distortion $$D^{(i)} = \frac{|A^{(i)}| - |1-\alpha_0^{(i)}|}{|\alpha_0^{(i)}|} \quad (9)$$

clearly must also converge to zero since $\alpha_0{}^{(i)}$ approaches unity as $|A^{(i)}|$ approaches zero.

The "eye opening" given by the output after the $n^{th}$ iteration is defined by $$I^{(n)} = 1 - D^{(i)}$$

$$\geqq 1-[D^{(0)}]^{2^n} \quad (10)$$

Now, the $i^{th}$ main pulse $\alpha^{(i)}{}_0$ which may be expressed in terms of $(i-1)^{th}$ input sequence $1-A^{(i-1)}$, and its tap settings, that is $$\alpha_0^{(i)} = \alpha_0^{(i-1)}(2-\alpha_0^{(i-1)}) - 2\sum_{L=1}^{N\cdot 2^{(i-1)}} \alpha_{-L}^{(i-1)}\alpha_L^{(i-1)} \quad (11)$$

when $i$ increases, the sidelobes become insignificant, and the main pulse $\alpha_0{}^{(i-1)}$ approaches unity as does $\alpha_0{}^{(i)}$ $$\alpha_0^{(i)} \cong \alpha_0^{(i-1)} (2 - \alpha_0^{(i-1)}) \alpha\ 1 \quad (12)$$

In FIG. 1B an input sequence 1−A is fed to a signal averaging circuit 2. The function of signal averaging circuit 2 is to minimize the effect of random noise in the input sequence on the optimal tap gain settings of the cascaded equalizer. Signal averaging circuits 2 are well known to those skilled in the electronics art and since it forms no part of the present invention and, indeed, is not even a necessary component in the operation of the cascaded equalizer stages, no further details will be given until later. A variable gain arrangement 3 consisting of a variable attenuator or amplifier adjusts the amplitude of the main pulse of the input sequence to a desired value. An input sequence represented by the function 1−A is then applied to a plurality of equalizer stages 10 all of which are substantially identical differing only in the number of delay sections and adjustable taps from stage to stage. Thus, the description that follows applies to each of the cascaded stages 10; the output of the first stage being applied to the input of a succeeding stage.

In FIG. 1B, equalizer 10 comprises a uniform delay line 11 having taps 12 uniformly spaced along the length thereof at desired intervals. A shift register having a plurality of individual stages may be substituted in place of delay line 11 without departing from the spirit and scope of the present invention. Taps 12 are connected to an output via a summing amplifier 13 or other device that permits signal addition. Signal multipliers 14 are interposed between individual taps 12 from delay line 11 and summing amplifier 13. Signal multipliers 14 may be any one of a number of devices well known to those skilled in the equalizer art which may be adjusted either electrically or mechanically to provide desired tap settings of proper values and polarities. In the present arrangement, it is the adjustment of multipliers 14 to values as determined by the algorithm utilized which determines the transmission characteristic of the overall system. Dotted lines 15 connected to the arrow associated with each of multipliers 14 represent a mechanical linkage from tap adjusting means 16 shown in block diagram form in FIG. 1B and more specifically indicated in FIG. 1C. Once the tap settings of multipliers 14 have been set to their final condition, an input sequence is passed via summing amplifier 13 from the output of one stage to the input of a succeeding stage. The output of the first equalizer stage during the first iteration passes through each succeeding equalizer stage until it reaches the output of the $n^{th}$ stage 10, at which point, the input function 1−A is converted to the function 1+A in a summing circuit 17 which, in effect, adds 2 to the inverse of the input function. Generally, this summing function is accomplished by detecting the center of the input sequence using a threshold detector. Upon detecting the center pulse, a gate is opened and the value 2 is added to the value of the center pulse. This operation may be characterized mathematically as:

$$2-(1-A)=1+A$$

Analog or digital versions of summing circuits are well known to those skilled in the computer and equalizer art. Typical analog embodiments may be found in a volume entitled "Analog Computation" by A. S. Jackson, McGraw Hill Book Co., 1960 at page 47. Typical digital versions may be found in "Analog and Digital Computer Technology" by N. Scott, McGraw Hill Book Co., 1960, at page 325.

The output of summing circuit 17 is applied to a switch 18 which is schematically shown in FIG. 1B. Switch 18 may be any mechanically or electronically actuated switch which is capable of connecting an input to one of a plurality of output contacts. In FIG. 1B, all of the output contacts of switch 18 except one are shown connected to tap adjusting means 16 which are shown as blocks in FIG. 1B. Each of the tap adjusting means 16 provides an output which is utilized to adjust the tap settings represented by arrows on multipliers 14. The tap settings of multipliers 14 are adjusted by mechanical linkages which are represented by dotted lines 15 in FIG. 1B which emanate as outputs from tap adjusting means 16.

Utilizing this general arrangement the modified output of the cascaded equalizer stages of FIG. 1B is selectively applied to a tap adjusting means 16 associated with a particular equalizer stage 10. The tap adjusting means 16 is activated by the output from summer 17 and, the latter provides outputs which are weighted in accordance with the particular output function.

Figure 1C:
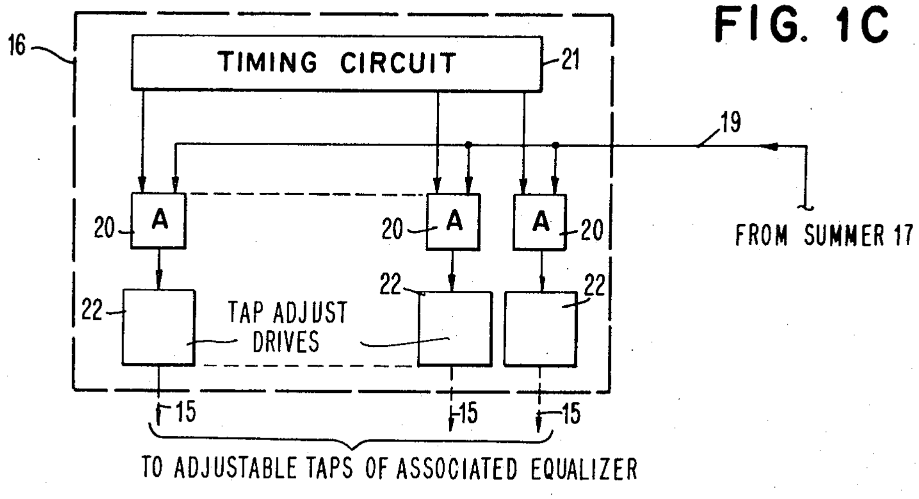
FIG. 1C is a block diagram of the tap adjusting means shown in FIG. 1B showing the conversion of the output sequence of the summing amplifier to signals which adjust the taps of an associated equalizer.

An arrangement which may be utilized for tap adjusting means 16 is shown in block diagram form in FIG. 1C. The output of the cascaded stages 10 is applied via a conductor 19 to a plurality of AND gates 20. The number of AND gates 20 is equal to the number of multipliers 14 associated with an equalizer stage 10. A timing circuit 21 provides a separate output connection to each of the AND gates 20. Each AND gate 20 provides an output when there is coincidence between a timing circuit pulse applied to AND gates 20 from timing circuit 21 and a sampled value of the output of the cascaded equalizers after a single iteration. The output of AND gates 20 is applied to tap adjust drives shown as blocks 22 in FIG. 1C. Tap adjust drives 22 may include a small motor, the output of which is proportional to the output of an associated AND gate 20. These arrangements are so well known to those skilled in the equalizer art that a detailed explanation of the tap adjust drives is unnecessary. U. S. Pat. No. 3,289,108 in the name of Davey et al., issued Nov. 29, 1966 shows in FIG. 2 and 3 thereof a multiplier arrangement and a circuit arrangement of control signal producing circuitry, respectively which could be utilized in the practice of the present invention. Tap adjust drives 22 provide a mechanical output proportional to the output of AND gates 20 which is mechanically coupled via linkages represented by dotted lines 15 to the adjustable multipliers 14 associated with an equalizer stage 10. From the foregoing, it may be appreciated that the output of each of the cascaded equalizers stages 10, for each iteration, is provided to a different tap adjusting means 16 so that each succeeding input sequence is changed to the extent that the tap settings of the equalizer stages 10 have been changed during a previous iteration.

In operation, the tap settings of multipliers 14 associated with each of the equalizer stages 10 are first set to 0 with the exception of the multiplier associated with the center tap of each equalizer stage which is set to unity. An input sequence represented by the function 1−A is then applied to the input of the first equalizer stage. Because all the tap settings of multipliers 14 are all set to zero with the exception of the multipliers associated with the center tap of equalizer stages 10, the input sequence 1−A passes through all the equalizer stages 10 and appears at the output of the $n^{th}$ stage substantially unchanged from the input sequence 1−A. Upon passing through summer 17, an output 1+A is provided. This output is applied via a contact on switch 18 to the tap adjusting means 16 associated with the first equalizer stage 10. The tap settings of multipliers 14 are then adjusted according to the function 1+A. In actual practice, this consists of setting a plurality of potentiometers or attenuators to some desired values. Thus, for each multiplier a value is provided which substantially cancels or modifies the side lobes of the input sequence to reduce the side lobes to a minimum. Because of the interaction between the various portions of the input sequence, this is not accomplished in practice and further processing is required to further clean up the input sequence. The foregoing operation, may be characterized as the $0^{th}$ iteration which sets the tap settings of the first stage prior to the first iteration.

A new input sequence 1−A characterized as the first iteration is applied to the input of the first of equalizer stages 10. This input sequence is modified by the tap setting function 1+A and provides at the output of the summing amplifier 13 of the first of equalizer stages 10 an output represented by the function $1-A^2$. This output now passes through each of the remaining equalizer stages 10 substantially unchanged and appears at the output of the summing amplifier 13 of the $n^{th}$ of equalizer stages 10 as an output represented by the function $1-A^2$. This output is applied to summer 17 and results at the output of summer 17 in the function $1+A^2$. This function is applied via a contact on switch 18 to the tap adjusting means 16 associated with the second of the equalizer stages 10. Tap adjusting means 16 then adjusts multipliers 14 associated with the second of equalizer stages 10 in accordance with the function $1+A^2$.

A new input sequence 1−A characterized as the second iteration is now applied to the input of the first of equalizer stages 10 where it is modified by the tap settings of that equalizer stage to provide at the output of summer 13 associated with the first equalizer stage the function $1-A^2$. This output becomes the input to the second of equalizer stages 10 and is modified therein by the tap settings of multipliers 14 associated with the second of equalizer stages 10 in accordance with the function $1+A^2$ to produce at the output of summer 13 associated with the second of equalizer stages 10 the output represented by the function $1-A^4$. Since the tap settings of the remaining stages are still set to 0 with the exception of their center taps, the modified input $1-A^4$ appears at the output of summer 13 associated with the nth of the equalizer stages unchanged and is applied to summer 17. Summer 17 modifies the function $1-A^4$ to $1+A^4$ and this latter function is applied via a contact on switch 18 to the tap adjusting means 16 associated with the third of the equalizer stages 10. This is not specifically shown in FIG. 1B but it should be clear from what has gone before how this is implemented. The tap settings of the multipliers associated with the third of equalizer stages 10 are then modified in accordance with the function $1+A^4$ and the arrangement of FIG. 1B is prepared for the third iteration. From the foregoing, it should be clear that the input function 1−A has undergone two modifications before arriving at the output of summer 13 associated with the $n^{th}$ of equalizer stages 10. In the first of equalizer stages 10, the input function has been modified by the function 1+A and, in the second of equalizer stages 10, the input has been modified by the function $1+A^2$. Thus the input function 1−A is effectively modified by the product of the two tap settings of the first and second of equalizer stages 10. The product of $(1+A)(1+A^2)$ equals $1+A+A^2+A^3$. Multiplying the last mentioned modifying function by the input function 1−A produces at the output of the second of equalizer stages 10 the function $1-A^4$.

A new input sequence 1−A characterized as the third iteration is applied to the first of equalizer stages 10 where it is modified by the function 1+A. The resulting output $1-A^2$ is modified in the second of equalizer stages 10 by the function $1+A^2$ producing at the output thereof the function $1-A^4$. This function is in turn modified in the third of equalizer stages 10 by the function $1+A^4$ producing at the output of the $n^{th}$ equalizer stage the output $1-A^8$. This function is then modified in summer 17 to provide the modifying function $1+A^8$ which is applied via a contact on switch 18 to the tap adjusting means 16 associated with the fourth of the equalizer stages 10. The tap settings of multiplier 14 associated with the fourth of equalizer stages 10 are then adjusted in accordance with the function $1+A^8$ and the system of FIG. 1B is prepared for the fourth iteration. Again, it should be appreciated that an input sequence 1−A has been modified by three modifying functions $(1+A)(1+A^2)(1+A^4)$ to produce a total modifying function represented by the function $1+A+A^2+\ldots+A^7$. This last function multiplied by the input function 1−A provides an output equal to $1-A^8$.

Each succeeding iteration is operated on in a manner similar to that shown in connection with previous iterations. Thus, for the nth iteration, an input function 1−A is modified by the product of all the modifying functions of the $n$ equalizers producing a modifying function equal to $1+A+A^2+\ldots+A^{2^n-1}$. This latter function when multiplied by an input sequence 1−A results in an output $1-A^{2^n}$ at the output of equalizer 1. This output is normally applied to the input of a data receiver and further equalization is not required. In a normal case where the initial distortion is no more than 0.8, after five iterations, the distortion $D^{(5)}$ in the system has been reduced to substantially zero value and an equalized electrical signal has been achieved.

The description given hereinabove is summarized in the following TABLE 2 for the first four iterations using the arrangement of FIG. 1B.

TABLE 2

| Number of iterations | Modifying function applied to input function (1−A) | Output of successive stages | Output of summer, 17 | Equalizer overall function |
|---|---|---|---|---|
| 0 | 1 | 1−A | 1+A | 1+A |
| 1 | (1+A) | $1-A^2$ | $1+A^2$ | $\prod_{j=0}^{1}(1+A^{2^j})$ |
| 2 | $\prod_{j=0}^{1}(1+A^{2^j})$ | $1-A^4$ | $1+A^4$ | $\prod_{j=0}^{2}(1+A^{2^j})$ |
| 3 | $\prod_{j=0}^{2}(1+A^{2^j})$ | $1-A^8$ | $1+A^8$ | $\prod_{j=0}^{3}(1+A^{2^j})$ |
| 4 | $\prod_{j=0}^{3}(1+A^{2^j})$ | $1-A^{16}$ | $1+A^{16}$ | $\prod_{j=0}^{4}(1+A^{2^j})$ |

Figure 2:
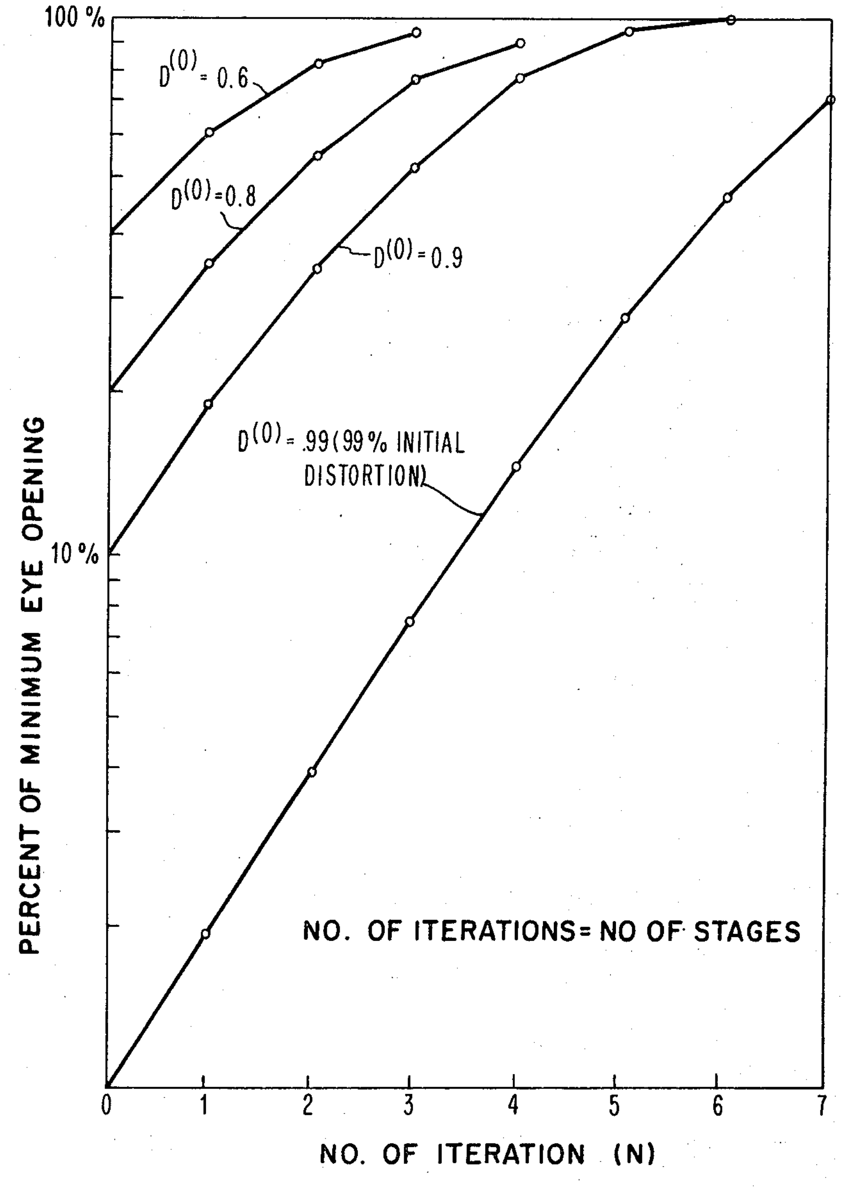
FIG. 2 is a graph of percent of minimum eye-opening versus the number of the iteration for various values of initial distortion. In this graph, the number of iterations equals the number of stages.

FIG. 2 shows the minimum eye-opening based on Eq. (15) for a set of initial distortions $D^{(0)}$ vs. $n$, the number of iterations or equalizer stages.

FIG. 1B shows the general structure of a cascaded automatic equalizer based on the principle described and analyzed above. The complete equalizer consists of a signal averaging circuit 2, a variable gain, 3, having a gain G and $n$ stages 10 of sub-equalizers in tandem. Signal averaging circuit 2 has the ability to generate output pulses, each of which is the average of a number of input pulses. The input test pulses are spaced according to the number of samples in an input pulse (i.e., so as not to overlap), while the output of this signal averaging circuit is usually spaced at a larger interval according to the expected delay of the main pulse through the equalizer. This circuit is bypassed as soon as the weight adjustments in cascaded stages 10 of the equalizer is completed.

The equalizer input sequence $\{\alpha_k^{(0)}\} = \{\alpha_{-N}^{(0)}, \ldots, \alpha_{-1}^{(0)}, 1, \alpha_1^{(0)}, \ldots, \alpha_N^{(0)}\}$ is defined to be the sequence of values of the input pulse sampled at time $-N, \ldots, N$. The procedure for adjusting the gain G and weights of various stages in the equalizer of FIG. 1B in terms of the above analysis is as follows:

1. Preset G, $\beta_0^{(1)}, \beta_0^{(2)}, \ldots, \beta_0^{(n)}$ to unity and all other weights to zero.

2. At the end of the first test pulse from the signal averaging circuit, the weights of the first stage are adjusted in such a way that the weights have the values negative to the corresponding sidelobes of the input pulse to this stage, that is, $\beta_l^{(1)} = -\alpha_l^{(0)}$ for $l \neq 0$.

3. Reset the gain, G, at the end of the second test pulse in order to normalize the output main pulse $\alpha_0^{(1)}$. However, this step may be skipped if the main pulse as expressed in Equation (11) is regarded as close enough to unity.

4. In each of the following iterations, the weights of the $p_{th}$ stage are set by $(2p-1)^{th}$ and the gain is set by the $2p^{th}$ test pulse such that the main pulse $\alpha_0^{(p)}$ at the output of that stage is unity. Alternatively, if step (3) is skipped as described above, further setting of gain G can be omitted and in such a case the taps of $p^{th}$ stage would be set by $p^{th}$ test pulse.

5. The iterative procedure ends either when weights in $n$ cascaded stages 10 are all adjusted or when the desired eye-opening has been obtained. In the latter case, the remaining stages need not be adjusted.

Theoretically, with the above weight-adjustment algorithm, the first stage of the cascaded equalizer must have at least 2N + 1 weights. The number of weights in the $p^{th}$ stage ($p \leq n$) should be at least one less than twice the number of weights in the $(p-1)^{th}$ stage. In practice, the maximum number of delay sections in any stages can be fixed to a reasonable number, if the residual distortion introduced by the truncation is tolerable.

It should be pointed out that the variable gain, G, shown in FIG. 1B, may be deleted under several possible conditions:

A. The gain G may be dropped if the option of normalizing the output main pulse is deemed unnecessary and adjustment of G is skipped in steps 3 and 4 as described above.

B. The gain G may be absorbed for each iteration in the weights of the corresponding stage. That is, the normalization in steps (3) and (4) is achieved by changing the tap gain settings from $\beta_j^{(i)}$ to $\beta_j^{(i)}/\alpha_0^{(i)}$. However, this necessitates the multiplication of weights as well as other implementation complexities which are not needed otherwise.

Another modification of the equalization procedures is to introduce a "proportionality" constant $c$ which is a scaling factor for the tap settings except the center tap. That is, the tap settings are changed from $\beta_j^{(i)}$ obtained in the above-mentioned procedure to $c\beta_j^{(i)}$ for $j \neq 0$. This modification has been observed to lead to faster convergence in various cases.

The main advantages offered by the cascaded equalizer embodiment are as follows:

Fast convergence in weight adjustment, a feature especially important in data transmission.

Relatively insensitive to noise even at the last stages of fine tuning, due to the signal averaging circuit. Additional test pulses can be sent before weight adjustments begin under adverse conditions.

Easy implementation with LSI due to the inherently modular structure of cascaded stages.

Furthermore, if this cascaded equalizer is implemented digitally, the adjustment algorithm requires little or no computation except to "read" the output signal values and to "write" the negative of these values into the gain registers (weights) and the same pulse can be obtained by $\beta_0^{(i+1)} = 2 - \alpha_0^{(i)}$. This can be efficiently implemented by means of sequential circuitry. An important advantage of such a digital implementation is its immunity to any additional noise amplification in the system.

In the practice of the foregoing invention, no specific implementation for the equalizer stages has been given. However, commercially available transversal filters may be adapted in a manner well known to those skilled in the art to produce the equalizer stages of the present invention.

We claim:

1. A method for equalizing an electrical signal comprising the steps of:

applying for $n$ iterations an electrical signal sequence represented by the function 1−A to the input of an equalizer arrangement having a plurality of adjustable tap settings; and, equalizing said signal to provide for $n$ iterations an output signal represented by the function $1-A^{2^n}$ where $n = 1, 2, 3 \ldots$, and $1-A = \alpha_{-N}^{(0)}, \ldots, \alpha_{-1}^{(0)}, \alpha_0^{(0)} = 1, \alpha_1^{(0)}, \ldots, \alpha_N^{(0)}$ and is the output of a transmission medium in response to a unit pulse input decomposed as the main pulse and side lobes, $\alpha$ is the amplitude value of a signal at a sampling instant and the subscripts associated with the term $\alpha$ are the numbers of the sampling instants before and after the main pulse.

2. A method according to claim 1 further including the step of applying said electrical signal to a signal averaging circuit to generate an output signal which is the average of a number of input signals.

3. A method according to claim 1 further including the step of:

normalizing the function 1−A at the beginning of each iteration to normalize the main pulse of the electrical signal sequence to unity.

4. A method according to claim 1 wherein the step of equalizing said signal includes the step of:

adjusting initially said plurality of tap settings to zero with the exception of the tap settings which correspond to said main pulse, the latter being adjusted to unity.

5. A method according to claim 4 wherein the step of equalizing said signal includes the steps of:

passing said electrical signal for the $m^{th}$ iteration through $n$ equalizer stages, modifying said electrical signal in a summing circuit to provide the function $1+A^{2^m}$, feeding back said last mentioned function to a tap adjusting means, and modifying the tap settings of the first equalizer stage in accordance with the function $1+A^{2^m}$ where $m + n-1$.

6. A method according to claim 5 further including the steps of:

passing said electrical signal for $n$ iterations through $n$ equalizer stages, modifying said signal in a summing circuit to provide the function $1+A^{2^n}$, feeding said last mentioned function to a tap adjusting means and, modifying the tap settings of the $n+1^{th}$ equalizer stage in accordance with the function $1+A^{2^n}$ where $n = 1, 2, 3 \ldots$ 7. A method for equalizing an electrical signal represented by the function $1-A$ comprising the steps of:

applying said electrical signal for $n$ iterations to the input of a plurality of cascaded equalizer stages each of which have adjustable tap settings the output of one stage being connected to the input of a succeeding stage; and, modifying said electrical signal in each of said equalizer stages to produce successive outputs at the $n^{th}$ of said equalizer stages for successive iterations as represented by the function $1+A^{2^n}$ where $n = 1, 2, 3 \ldots$, $1-A = \alpha_{-N}^{(0)}, \ldots, \alpha_{-1}^{(0)}, \alpha_0^{(0)} = 1, \alpha_1^{(0)}, \ldots, \alpha_N^{(0)}$ and is the output of a transmission medium in response to a unit pulse input decomposed as the main pulse and side lobes, $\alpha$ is the amplitude value of a signal at the sampling instant and the subscripts associated with the term $\alpha$ are the numbers of the sampling instants before and after the main pulse.

8. A method according to claim 7 wherein the step of modifying said electrical signal includes the step of:

adjusting said tap settings of the $n^{th}$ of said equalizer stages in accordance with the function $1+A^{2^m}$ where $m = n-1$.

9. A method for equalizing an electrical signal sequence represented by the function $1-A$ comprising the steps of:

applying said electrical signal for $n$ iterations to the input of a plurality of cascaded equalizer stages each of which have adjustable tap settings the output of one stage being connected to the input of a succeeding stage; and, modifying said electrical signal by adjusting said tap settings of the $n^{th}$ of said equalizer stages in accordance with values as represented by the function $1+A^{2^m}$ to produce successive outputs at each of said equalizer stages for successive iterations as represented by the function $1-A^{2^n}$ where $1-A = \alpha_{118\ N}^{(0)}, \ldots, \alpha_{-1}^{(0)}, \alpha_0^{(0)} = 1, \alpha_1^{(0)}, \ldots, \alpha_N^{(0)}$ and is the output of a transmission medium in response to a unit pulse input decomposed as the main pulse and side lobes, $n = 1, 2, 3 \ldots$, $m = n-1$, $\alpha$ is the amplitude value of a signal at the sampling instant and the subscripts associated with the term $\alpha$ are the numbers of the sampling instants before and after the main pulse.

10. A method according to claim 9 further including the step of:

normalizing the function $1-A$ at the beginning of $n$ of each iteration to normalize the main pulse of said electrical signal sequence to unity.

11. A method according to claim 9 wherein the step of modifying said electrical signal includes the step of:

applying said output signal after each iteration to a summing circuit to change said signal to a signal represented by the function $1+A^{2^n}$, determining the value of the last mentioned function for each sampling point of said electrical signal sequence and, adjusting said adjustable tap settings on the $n+1^{th}$ of said plurality of equalizer stages according to the value previously determined.

12. A method according to claim 11 further including the step of:

adjusting initially the tap settings of said plurality of equalizer stages to zero with the exception of tap settings which correspond to the main pulse of said sequence the latter being adjusted to unity.

13. Apparatus for equalizing an electrical signal comprising:

a signal source for producing an electrical signal a communications medium connected to said signal source which introduces distortion on said electrical signal to provide a distorted electrical signal represented by the function $1-A$, and means connected to said communications medium for equalizing said distorted electrical signal to provide at the output of said equalizing means an output signal represented by the function $1-A^{2^n}$ for $n$ iterations where $n = 1, 2, 3 \ldots$, and $1-A = \alpha_{-N}(\mathbf{0}), \ldots, \alpha_{-1}^{(0)}, \alpha_0^{(0)} = 1, \alpha_1^{(0)}, \ldots, \alpha_N^{(0)}$ and is the output of a transmission medium in response to a unit pulse input decomposed as the main pulse and side lobes, $\alpha$ is the amplitude value of said distorted signal at a sampling instant and the subscripts associated with the term $\alpha$ are the numbers of the sampling instants before and after the main pulse.

14. Apparatus according to claim 13 further including means interposed between said communications medium and said equalizing means for averaging said distorted electrical signal to generate an output signal which is the average of a plurality of input signals.

15. Apparatus according to claim 13 wherein said means for equalizing said distorted electrical signal includes a plurality of equalizer stages each having a plurality of adjustable tap settings, the output of one stage being connected to the input of a succeeding stage, means connected to the last of said equalizer stages for modifying said output signal to provide the function $1+A^{2^n}$ and, means connected to said modifying means and said adjustable tap settings for adjusting the tap settings associated with $n+1^{th}$ equalizer stage in accordance with said last mentioned function.

16. Apparatus according to claim 15 wherein said means for modifying said output signal includes a summer circuit which converts the function $1-A^{2^n}$ to $1+A^{2^n}$.

17. Apparatus according to claim 15 wherein said means for adjusting includes drive means connected to said adjustable tap settings responsive to the signal sequence represented by the function $1+A^{2^n}$.

18. Apparatus according to claim 15 wherein each said equalizer stage includes a tapped delay line.

19. Apparatus according to claim 15 wherein each said equalizer stage includes a shift register.

20. Apparatus according to claim 15 further including means connected to said modifying means for adjusting the tap settings of the first of said equalizer stages in accordance with the function $1+A^{2^m}$ where $m = n-1$.

21. Apparatus for equalizing an electrical signal represented by the function $1-A$ comprising:

means for applying said electrical signal for $n$ iterations to the input of a plurality of cascaded equalizer stages each of which have a plurality of adjustable tap settings the output of one stage being connected to the input of a succeeding stage; and means connected to the last of said plurality of equalizers and said plurality of adjustable tap settings for modifying said tap settings to produce successive outputs at the $n^{th}$ of said equalizer stage for successive iterations as represented by the function $1-A^{2^n}$ where $n = 1, 2, 3 \ldots$, and $1-A = \alpha_{-N}^{(0)}, \ldots, \alpha_{-1}^{(0)}, \alpha_0^{(0)} = 1, \alpha_1^{(0)}, \ldots, \alpha_N^{(0)}$ and is the output of a transmission medium in response to a unit pulse input decomposed as the main pulse and side lobes, $\alpha$ is the amplitude value of a signal at a sampling instant and the subscripts associated with the term $\alpha$ are the numbers of the sampling instants before and after the main pulse.

22. Apparatus according to claim 21 wherein said means for modifying includes a summer circuit which converts the function $1-A^{2^n}$ to $1+A^{2^n}$ 23. Apparatus according to claim 22 further including tap adjusting means connected to said summer and each of said equalizer stages for converting the output electrical signal of said summer circuit to mechanical motion and linkages connected between said tap adjusting means and said plurality of adjustable tap settings.

24. Apparatus for equalizing an electrical signal sequence represented by the function $1-A$ comprising:

means for applying said electrical signal for $n$ iterations to the input of $n$ cascaded equalizer stages each of which have a plurality of adjustable tap settings the output of one stage being connected to the input of a succeeding stage; and means for modifying said electrical signal sequence by adjusting said tap settings of successive stages in accordance with the function $1+A^{2^m}$ to produce an output at the $n^{th}$ equalizer stage for successive iterations as represented by the function $1-A^{2^n}$ where $n = 1, 2, 3 \ldots, 1-A = \alpha_{-N}^{(0)}, \ldots, \alpha_{-1}^{(0)}, \alpha_0^{(0)} = 1, \alpha_1^{(0)}, \ldots, \alpha_N^{(0)}$ and is the output of a transmission medium in response to a unit pulse input decomposed as the main pulse and side lobes, $m = n-1$, $\alpha$ is the amplitude value of a signal at a sampling instant and the subscripts associated with the term $\alpha$ are the numbers of the sampling instants before and after the main pulse.

25. Apparatus according to claim 24 wherein said means for modifying includes a summing circuit connected to the last of said plurality of equalizer stages to change said signal to a signal represented by the function $1+A^{2^n}$, means connected to said summer circuit for determining the value of said last mentioned function for a plurality of sampling points of said electrical signal sequence, and means for adjusting each of said plurality of tap settings on the $n+1^{th}$ of said plurality of equalizer stages.

26. Apparatus according to claim 24 further including, means connected to the first of said plurality of equalizer stages for averaging said electrical signal to generate an output signal which is the average of a plurality of input signals.

* * * * *